United States Patent [19]

Pardi et al.

[11] Patent Number: 4,487,066
[45] Date of Patent: Dec. 11, 1984

[54] SYSTEM FOR SENSING AND SIGNALLING THE AMOUNT OF FUEL IN A VEHICLE TANK, PARTICULARLY AIRCRAFT TANK

[75] Inventors: Rodolfo Pardi; Giorgio Marchi, both of Milan, Italy

[73] Assignee: Logic S.p.A., Italy

[21] Appl. No.: 242,320

[22] Filed: Mar. 10, 1981

[30] Foreign Application Priority Data

Jun. 13, 1980 [IT] Italy .................... 22746 A/80

[51] Int. Cl.³ .................... G01F 23/26; G01F 27/26
[52] U.S. Cl. .................... 73/304 C; 364/509; 364/571
[58] Field of Search .......... 73/304 C; 324/61 QS, 324/61 P; 328/4; 364/509, 556

[56] References Cited

U.S. PATENT DOCUMENTS

| | | | |
|---|---|---|---|
| 3,140,608 | 7/1964 | Clark | 73/304 C |
| 3,706,980 | 12/1972 | Maltby | 73/304 C X |
| 3,744,314 | 7/1973 | Lenny | 73/304 C |
| 3,827,300 | 8/1974 | Thaler | 73/304 C |
| 3,988,668 | 10/1976 | Bowers | 324/61 P |
| 4,080,563 | 3/1978 | Marsh et al. | 324/61 QS X |
| 4,099,118 | 7/1978 | Franklin et al. | 328/5 |
| 4,142,415 | 3/1979 | Jung et al. | 73/304 C |
| 4,199,984 | 4/1980 | Huddart et al. | 73/304 C |
| 4,229,798 | 10/1980 | Rosie et al. | 364/571 X |
| 4,258,422 | 3/1981 | Dougherty et al. | 364/509 X |
| 4,296,472 | 10/1981 | Sarkis | 73/304 C X |
| 4,303,984 | 12/1981 | Houvig | 364/571 |
| 4,352,159 | 9/1982 | Colby | 364/509 |
| 4,355,363 | 10/1982 | Colby et al. | 364/509 |

FOREIGN PATENT DOCUMENTS

1527671 10/1978 United Kingdom ............ 73/304 R

OTHER PUBLICATIONS

Publ. "COS/MOS Dual Up Counters" Exhibit A, B, C, RCA #CD4518B, pp. 292, 7-73 and 323.
Published International Application Publication No. WO80/02600, Nov. 27, 1980 "A Device for Detecting and Measuring Small Capacitance Variations".

Primary Examiner—Daniel M. Yasich
Attorney, Agent, or Firm—Ostrolenk, Faber, Gerb & Soffen

[57] ABSTRACT

Apparatus for measuring the amount of fuel in a tank comprises a capacitive probe whose capacitance is a function of the fuel level in the tank, an electronic circuit including a monostable multivibrator to which the probe is connected as a timing capacitor and a trigger source for repetitively triggering the monostable multivibrator to provide a series of output signals whose duty cycle is a function of probe capacitance, and a display responsive to the pulses or a signal derived from them to indicate the amount of fuel in the tank. To make the monostable output signal duty cycle directly proportional to the amount of fuel rather than to the fuel level, when the capacitance profile is not matched to the tank, the monostable duty cycle is modified before display, by transform unit (19) which provides, first, a conversion of the output signal of the multivibrator proportional to the fuel level into numerical value (20), after, a modification of said numerical value into numerical value proportional to the amount of the fuel using a look-up table stored in a read only memory (ROM) (21) and, finally, a conversion of this last-mentioned numerical value into output signal duty cycle proportional to the fuel amount in the tank (22).

10 Claims, 11 Drawing Figures

SYSTEM FOR SENSING AND SIGNALLING THE AMOUNT OF FUEL IN A VEHICLE TANK, PARTICULARLY AIRCRAFT TANK

FIELD OF THE INVENTION

This invention relates to apparatus for measuring the amount of fuel in a fuel tank.

The invention is particularly concerned with sensing and signalling the amount of fuel in the tank of a vehicle and more particularly an aircraft fuel tank.

BACKGROUND TO THE INVENTION

One kind of apparatus for measuring the amount of fuel in a tank comprises a capacitive probe disposed in the tank to have a capacitance that is a function of the amount of fuel in the tank; an electronic circuit connected to the probe to provide an output signal that is a function of the capacitance of the probe; and display means responsive to the output signal to provide an indication of the amount of fuel in the tank.

In apparatus of the above defined kind, the probe may comprise a pair of spaced coaxial electrodes constituting a cylindrical plate capacitor between the plates of which the fuel enters to vary the probe capacitance as a function of fuel level, assuming the capacitor is mounted to have its axis vertical. The probe thus acts as a capacitive transducer. The capacitance is at a maximum value when the tank is full, and at a minimum value when the tank is empty.

The tank may be of irregular or non-uniform cross-section such that the amount of fuel in the tank is not linearly proportional to the fuel level. The probe may be given a capacitance profile, i.e. capacitance as a function of fuel level, that is adjusted to the shape of the tank. When the capacitance varies essentially in accordance with the amount of fuel, this will be termed a "matched profile". The matched profile can be achieved by having a smooth cylindrical outer electrode or plate and an inner electrode or plate of varying diameter along the axis so as to vary the radial distance between the plates. Where the electrodes are both smooth cylindrical surfaces, i.e. a uniform profile, this will match a tank of uniform cross-section.

In order to sense the changes in probe capacitance and accordingly the amount of fuel, the probe plates are connected in an electronic measuring circuit which in most applications comprises a bridge circuit located remotely from the probe, for instance in the vehicle cabin. The bridge or similar circuit, which supplies an analog signal, is then connected to a display device, for example a milliammeter, arranged on the vehicle dashboard or instrument panel, so that the vehicle driver or pilot can at any instant ascertain the amount of fuel in the tank.

These conventional systems suffer from the disadvantage that the analog signal to be measured is small and readily subject to disturbance due to the fact that the capacitance to be measured is of a relatively small value and the probe capacitor is remote from the measuring circuit.

The probe capacitance is typically in the range of 50–100 pF, as it is impossible for overall size and weight reasons to increase the plate dimensions, nor is it possible for reasons of safety to reduce the capacitor plate spacing below a certain limit.

On the other hand, the distance separating the probe from the measuring circuit may be as much as 15–20 meters. For example in an aircraft the tanks having the probes immersed therein are located on the wings or in the fuselage of the aircraft while the measuring circuit is normally placed in the cabin. Under such circumstances the capacitance measure may be inaccurate.

The measurement of the analog signal is disturbed by signals induced on the cable or wire connecting the probe to the measuring circuit, and which are caused by external electromagnetic fields, such as generated by the vehicle radio set. The measurement is also affected by the possible variations in capacitance of the connecting cable or wire. In order to reduce these disturbances, the use of coaxial cables is often resorted to, which adds to the total cost of the installation.

On the other hand, in the conventional systems it is not possible to ground one probe capacitor plate in order to provide protection against disturbances, as the measuring circuit does not allow grounding of the probe plates.

A further disadvantage of the prior systems is that a test of correct operation of all components of the system under the effective operating conditions cannot be carried out. Thus, in the prior art systems, the actual capacitance of the probe is replaced during this test by a fixed capacitor and, as a result, the probe capacitor is not connected in the system, so that the testing of the circuit operation does not check the probe as well.

Particular importance is placed on measurement accuracy where aircraft are connected where serious consequences arise if erroneous signalling indicates to the pilot a fuel reserve that does not exist in reality.

It will be shown hereinafter how the present invention can be put into practice for sensing and signalling the amount of fuel in a tank, particularly in an aircraft tank, so as to allow accurate measurement of the capacitance of the probe, even in the presence of strong disturbing electromagnetic fields and with a probe located at a considerable distance from the display device, whereby the pilot can be given an accurate indication of the fuel in reserve. The apparatus to be described has good protection against radio disturbances or noises, so as to be relatively insensible to interference.

The preferred apparatus of the invention may be implemented with critical components mounted in a unitary structure located directly on the fuel tank and designed in such a way as to allow a test of correct operation of the system, while all of the components, probe included, are energized.

In addition it will be shown how the invention may be put into practice either with a probe having a capacitance profile matching that of the tank in which is is located or with an unmatched probe, e.g. a smooth profile probe in a non-uniform tank, by taking other measures. Still further the apparatus to be described can be constructed in a way capable of supplying suitable information for processing by a vehicle computer.

SUMMARY OF THE INVENTION

More generally stated the present invention provides apparatus of the kind set forth above in which the electronic circuit comprises a monostable multivibrator to which the probe is connected as a timing capacitance therefor such that upon triggering of the monostable multivibrator, its output signal duration is a function of probe capacitance; and a trigger source connected to the monostable multivibrator to supply signals of constant period thereto to repetitively trigger the monostable multivibrator whereby the duty cycle of the resultant monostable multivibrator output signals is a function of probe capacitance. The said output signal is constituted by the multivibrator output signals or is derived from them. The type of the display device depends on the form of output signal and the probe used as will be explained later.

The invention may be put into practice with particular advantage by mounting the multivibrator directly on the probe to connect directly thereto, thereby avoiding connecting cables or the like. The trigger source may comprise a source of rectangular wave signals of constant period, and thus frequency, which may be used in checking and calibrating the apparatus in a manner that will be described.

The apparatus may be put into practice in cases where the probe has a capacitance profile not matched to the shape of the tank, for example the probe is of the type having coaxial cylindrical plates of constant diameter (i.e. smooth, not shaped plates) in a tank of irregular shape. In this case the electronic circuit may include transform means responsive to the multivibrator output signals to perform a transform function thereon and to provide the output signal to have a value proportional to the amount of fuel in the tank. The transform means may use a device, such as a read only memory (ROM) storing pairs of corresponding numerical values (in digital form). The input numerical values for the device are obtained by digitising the multivibrator output signals used in the ROM to obtain the corresponding corrected numerical values which are then outputted as digital signals or converted back to a series of output signals whose widths are proportional to the amount of fuel in the tank.

The invention and its practice will now be further described with reference to embodiments of it illustrated in the accompanying drawings.

DETAILED DESCRIPTION OF THE DRAWING

Figure 1:
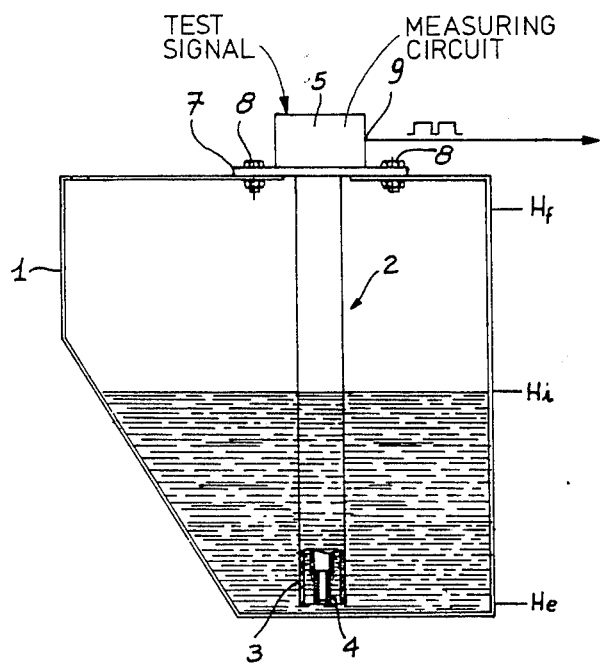
FIG. 1 is a diagrammatic sectional view of an embodiment of the invention showing a probe and measuring circuit assembly mounted on a fuel tank of non-uniform cross-section.

Referring to FIG. 1, reference numeral 1 designates the fuel tank of a vehicle and Hf, He and Hi respectively designate the full level, empty level and a general intermediate level of the fuel. A probe 2 is immersed in the tank, comprising two coaxial cylindrical plates 3 and 4 constituting a capacitor whose capacitance depends on the level of the fuel which enters the probe between the plates. The tank 1 is of irregular shape, i.e. has a non-uniform cross-section, and the inner plate 4 of the probe is suitably shaped in order to vary the radial distance relative to the outer plate 3, so that the probe capacitance will correspond to the fuel amount or volume in the tank, and not to the fuel level.

Figure 4:
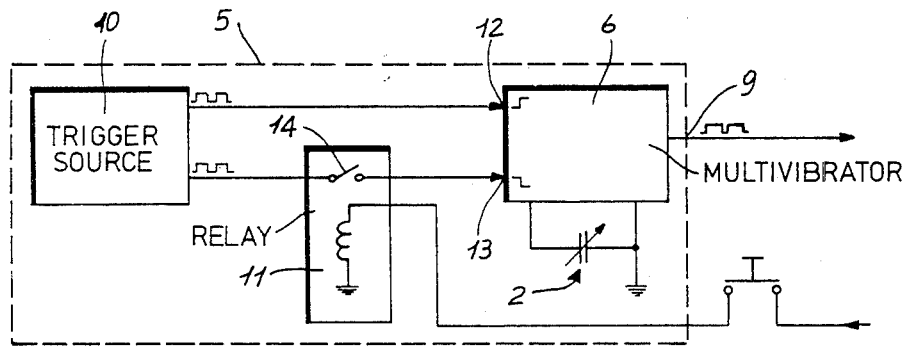
FIG. 4 is a block diagram of the electronic circuit co-operating with the probe in the apparatus of FIG. 1.

The probe 2 is connected to an electronic circuit 5 for measurement of the probe capacitance, this circuit comprising as a basic component a monostable multivibrator, in the following merely referred to as multivibrator, and designated as 6 in FIG. 4 and other figures of the drawings.

The measuring circuit is contained in a structure directly mounted on the probe to form with the latter a unitary assembly 2-5, which is installed on the tank, for example by means of a flange 7 and screws 8 with the probe mounted to depend vertically into the tank. By means of such mounting, no cable or wire connecting the probe to the measuring circuit is required. The output 9 of the measuring circuit is connected to a display device or reading instrument (not shown in FIG. 1) located remote from the tank, for example on the vehicle dashboard or instrument panel.

Figure 2:
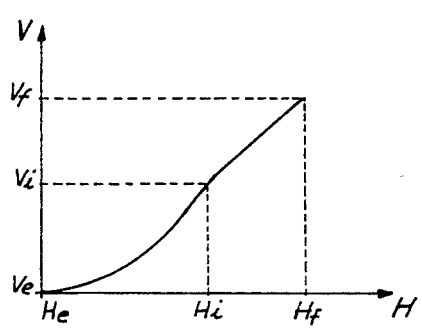
FIG. 2 is a graph illustrating a typical fuel volume versus fuel level characteristic for a fuel tank of irregular (non-uniform) shape.

In the diagram of FIG. 2, a typical curve V=f(H) is shown, wherein V is the fuel volume and H the fuel level in the tank 1. In this diagram, references Vf, Vi and Ve respectively designate the fuel volumes corresponding to levels Hf, Hi and He.

Figure 3:
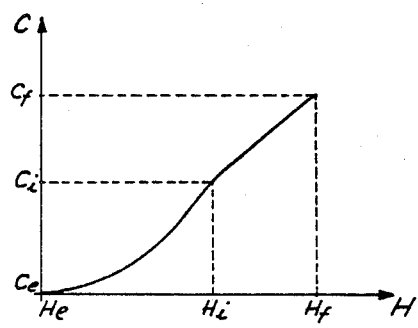
FIG. 3 is a graph illustrating a typical probe capacitance versus fuel level for a probe with shaped inner plate providing a capacitance profile to match the shape of the tank of FIG. 1.

In the diagram of FIG. 3, the typical curve C=f(H) is shown, wherein C is the capacitance for the shaped probe, and H is still the fuel level. In this diagram, Cf, Ci and Ce show the value of maximum, intermediate and minimum capacities of the probe at levels Hf, Hi and He. It is seen from a comparison of FIGS. 2 and 3 that the capacitance profile matches the tank shape in that the capacitance represents fuel volume rather than level.

The measuring circuit 5 is shown in further detail in the block diagram of FIG. 4, wherein reference numeral 6 designates the multivibrator, 10 a trigger source for the multivibrator, e.g. an astable multivibrator, and 11 a remote controlled relay actuated at intervals for carrying out a test of correct operation of the apparatus, as explained hereinafter.

The multivibrator 6 has the plates of probe 2 connected thereto to constitute the timing capacitor for the multivibrator. The duration of the monostable output signal, each time the monostable is triggered, will vary as a function of probe capacitance and thus as a function of the amount of fuel.

Figure 5:
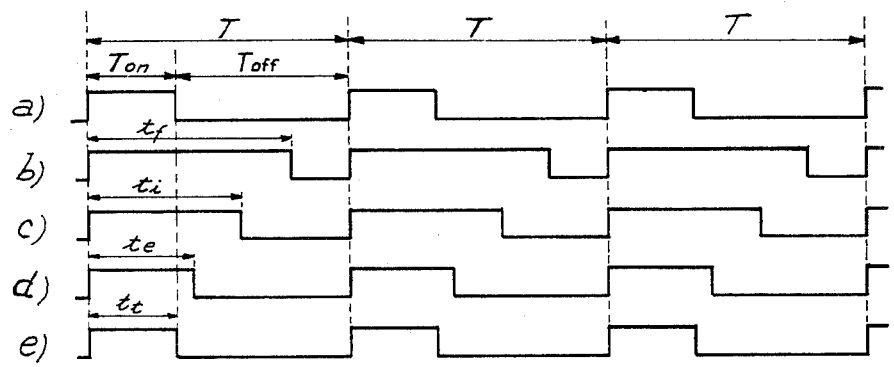
FIG. 5 shows a series of multivibrator waveforms and their relation to the applied trigger signal for the circuit of FIG. 4 with different probe capacitances.

The trigger source 10, which can use any type of oscillator, supplies a rectangular wave signal having a constant period T, and thus a constant frequency, and an also constant conduction duration Ton, as shown in FIG. 5a. Such a rectangular wave signal is continuously applied to the control or trigger input 12 of the multivibrator to repetitively trigger same and, at intervals for test purposes, also to the multivibrator's reset input 13 when the relay 11 is energised and closes the contact 14.

FIG. 5a shows the on and off states of the output signal of the source 10 lasting for times Ton and Toff in each cycle of period T. This periodic signal is applied to the trigger input 12. The output signal at the output 9 of the repetitively triggered multivibrator is a digital signal (i.e. ON or OFF states) as shown at FIG. 5b, c, d and e for different conditions.

Figure 6:
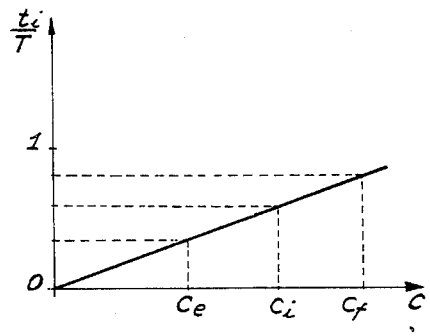
FIG. 6 is a graph illustrating the duty cycle of the multivibrator output signal as a function of probe capacitance.

The monostable output signal has a duration which for the general case will be called $t_i$ (FIG. 5c) and which varies linearly with the capacitance of probe 2 and thus with the fuel amount in the tank. The duration of the monostable output signal (ON state) varies from a maximum time $t_f$ corresponding to the maximum capacity Cf at the condition of a full tank (FIG. 5b), to a minimum time $t_e$ corresponding to the minimum capacity Ce at the condition of an empty tank (FIG. 5d). The output signal duration $t_t$ (FIG. 5e) equal to the time Ton of the trigger signal is equal to the duration of the output signal at the multivibrator output 9 during a test of correct operation. As well known, the ratio of the general duration $t_i$ of the output signal at the output 9 to the cycle period T defines the duty cycle of the output signal varying in the range of between 0 and 1 as a function of the probe capacity C, as shown in FIG. 6, where it is shown to be a linear function of capacitance which, in turn it will be recalled, is a measure of the amount of fuel.

A display device or reading instrument or other suitable apparatus responsive to the duty cycle of the multivibrator output signals or to signals derived from said multivibrator pulses, enables the amount of fuel in the tank to be indicated to the vehicle driver or pilot.

Checking of correct operation, which may be automatically carried out or by the driver or pilot's manual instigation, consists of temporarily energizing said relay 11, so that the rectangular wave signal supplied by the trigger source 10 is applied to the multivibrator reset input 13 as well as the trigger input 12.

Under these circumstances, the multivibrator 6 is reset by the trigger signal and the output signal at output 9 of the multivibrator 6 has an "on" duration $t_t$ (see FIG. 5e) equal to the period -("on" state) - Ton of the trigger signal applied to the control or trigger input 12. Thus the multivibrator output signal duration is reduced to that of the trigger signal source 10.

The monostable multivibrator is so calibrated that, in normal measurement, when the tank is empty, its output signal has a duration equal to that of the trigger signal whereby te=Ton=$t_t$. Consequently the reading or display instrument provides the same indication for a test of correct operation at any amount of fuel or for the empty tank condition.

It should be noted that in the course of such a test all of the system components are energized including the probe 2 active in the operation of the multivibrator 6.

The multivibrator described is a two input type of multivibrator, namely having a trigger input and a reset input. Such multivibrators are per se known and by way of example reference is made to the use of the integrated circuit type 555 disclosed in the data book issued by Signetics, "Digital, Linear, Mos Data Book", edition 1974, pages 6-67.

The multivibrator output 9 is connected to a display device or reading instrument, either directly or through suitable processing circuitry depending on the nature of the display devices and the probe used.

Figure 8:
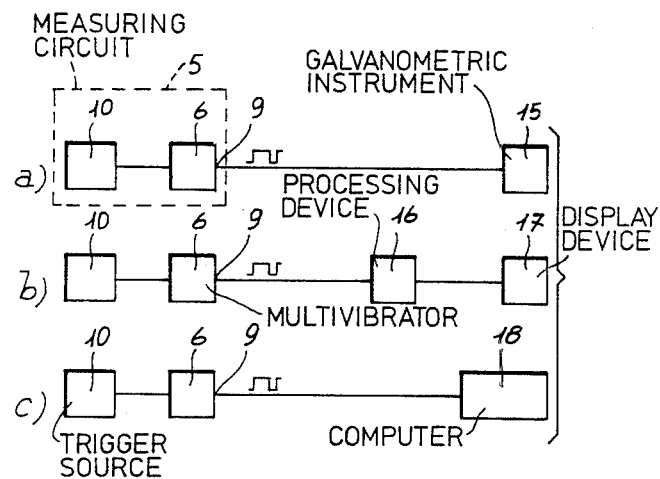
FIG. 8 shows block diagrams illustrating various arrangements of electronic circuit and display devices for apparatus using the probe of FIG. 7.
Figure 10:
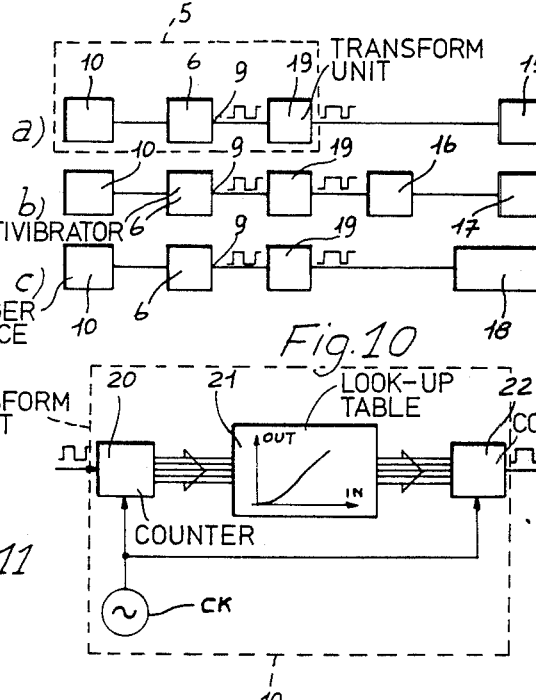
FIG. 10 shows block diagrams illustrating various arrangements of electronic circuit and display device for apparatus using the smooth probe of FIG. 9 in a tank of irregular shape.

Various circuit arrangements to suit different circumstances are shown in FIGS. 8 and 10. For simplicity in representation, the probe 2 connected to the multivibrator 6 and said test circuit comprising the relay 11 are not shown in these figures.

Figure 7:
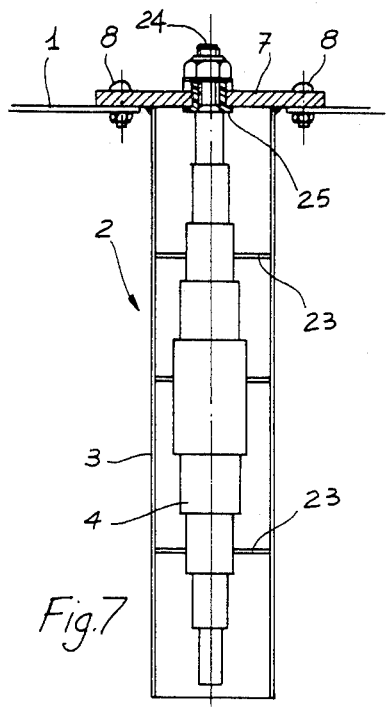
FIG. 7 is a diagrammatic sectional view of a probe with a shaped inner plate to provide a capacitance profile to match a tank of irregular shape.

In the case of a tank of irregular shape and a matched probe, as shown for example in FIG. 7, the multivibrator output 9 can be directly connected to a display device which comprises a galvanometric type of instrument 15 as illustrated in FIG. 8a. Alternatively in FIG. 8b, the electronic circuit includes a processing device 16 which averages the multivibrator pulses to provide a d.c. signal whose magnitude is proportional to the average value of the duty cycle of the pulses, the display device 17 in this case comprising an analog (index or pointer) type of instrument, such as a potentiometric instrument. The processing device 16 is located near to this instrument. On the other hand, the processing device 16 may act to digitize the multivibrator output signals with respect to their duration, the display device 17 comprising a digital (numerical indication) instrument.

Additionally, as indicated in FIG. 8c, the multivibrator output signals can be applied to a processing device or apparatus in the form of a centralized computer 18 which may include the display means or be separate therefrom and which performs different functions, for example calculation of or control of other parameters involving the vehicle, such as operating range or controlling centre of gravity.

Figure 9:
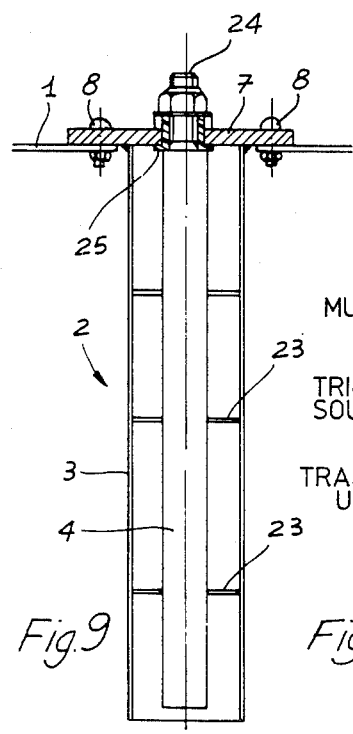
FIG. 9 is a diagrammatic sectional view showing a probe with both uniform (smooth) plates for use in a tank of regular or irregular shape.

In the case of a tank of irregular shape but where desirous of using an unmatched probe, such as a probe having a smooth capacitance profile as shown in FIG. 9, the multivibrator output 9 is connected, as shown in illustrations a, b and c of FIG. 10 corresponding to FIGS. 8a, b and c, to the display device 15, or to the processing device 16, or to the centralized computer 18 respectively, through a transform unit 19 that transforms or converts the duration of the multivibrator output signals, in this case with a smooth profile probe proportional to the fuel level only, into a corresponding series of fuel volume signals whose duration and duty cycle is proportional to the amount of fuel, that is into the output signal which would have been supplied by the multivibrator 6 had it had a matched probe connected thereto.

Figure 11:
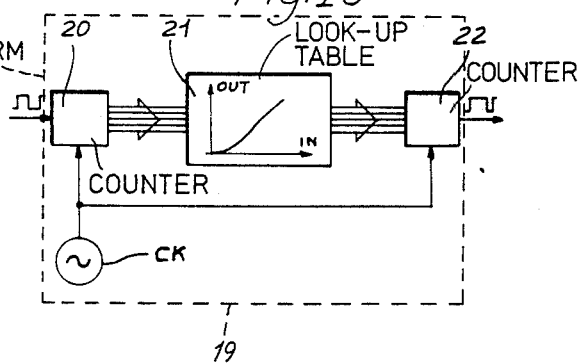
FIG. 11 is a block diagram for a component of the systems of FIG. 10.

FIG. 11 shows one simple implementation of the transform unit 19. It comprises an input counter 20 that counts pulses from a clock source CK and that is gated by the output signals of multivibrator 6 that are a function of the fuel level, to provide numerical count values corresponding to the output signal durations. The numerical values are applied to a device such as a read only memory (ROM) that is arranged to provide a lookup table 21. In the look-up table, pairs of values are stored such that each numerical value addressing the ROM has a corresponding numerical value that represents the amount of fuel instead of the fuel level that is inputted. Of course the look-up table 21 will be established having regard to the shape of the tank.

The numerical value that represents the amount of fuel is not used directly but is applied to an output counter arrangement or pulse former 22 which with the aid of the clock pulses transforms this last-mentioned numerical value into a rectangular wave signal having an "on" period corresponding to said numerical value, and accordingly a duty cycle proportional to the fuel amount in the tank. Therefore, as a result the signal at the output of the counter arrangement 22 is essentially the same signal at the output 9 of the multivibrator with the matched probe in FIG. 8.

The transform unit 19 is preferably mounted close to the probe along with the units contained in structure—or measuring circuit—5 so as to provide a unitary assembly comprising the monostable multivibrator, probe, trigger source, relay and the transform unit.

In the case of a tank of regular shape (uniform cross-section), the smooth probe of FIG. 9 can be used as a matched probe but then using the circuits shown in FIG. 8.

As more clearly shown in FIGS. 7 and 9, the outer plate 3 of the probe 2 is connected, for example by welding, to the flange 7 which, in turn, is secured or attached to the tank 1, so that, assuming the tank is of electrically conductive material and is grounded, this plate 3 is also grounded with the advantage of shielding or screening the inner plate 4 against external disturbance or noise signals. The inner plate 4 is centred on the outer plate 3 by means of centering rings 23, whereas at the attachment side it has a tang or spigot 24 passing through the flange 7 to the exterior of the tank and directly connecting to the multivibrator 6, so avoiding the use of cable or wire between the probe and the multivibrator. The tang or spigot is isolated from the flange by means of a bushing 25 of insulating material.

The measuring circuit, in the case also including the transform unit 19, is housed within a protecting shell which, in turn, is secured to said flange 7.

In summary, by means of a measuring circuit including a monostable multivibrator located directly on the probe, a local measurement of the probe capacitance is effected, and the informationbearing signals transmitted to the display device or apparatus are digital type of signals and accordingly not liable to interference from external disturbances or noises. In referring to digital type signals thay may be actual digital (numerical) values or digital in the sense of having one or other of two states, i.e. on or off.

The measurement accuracy is also aided by the grounding of the outer plate 3 of the probe which provides an electromagnetic shielding or screening for the inner plate.

Additionally, with an assembly comprising a multivibrator 6, probe 2, trigger source 10, relay 11 and, in the appropriate case, the transform unit 19, checks and calibration of the measuring circuit output signals can be effected at the time of manufacture in order to take into account the manufacturing tolerances of the probe, so that the complete assemblies are interchangeable upon installation on the vehicle without requiring any further calibration.

With tanks of irregular shape, the system also allows the use of probes having smooth plates (see FIG. 9), which are of a simple construction and may be used for any system, since corrections or adaptations can be effected by means of circuits, such as those shown in FIG. 11 requiring only modification of the look-up table 21 to meet individual shapes of the tank.

It is another advantage that in the course of the test for correct operation of the system also the probe is checked, as the plates thereof form the timing capacitor for the multivibrator which is always connected.

Finally, owing to the digital type of output signal, the system may be connected with a computer provided for other purposes.

Variations and modifications to the above described embodiments may be made. Thus, by way of example, reference was made with respect to the multivibrator 6 of FIG. 4 and FIG. 5 to a rectangular wave trigger signal which, applied to the trigger input 12, causes the triggering of the monostable multivibrator 6 by the leading edge of the trigger signal and which, applied to the reset input 13, resets the multivibrator with the trailing edge of the trigger signal during a test of correct operation.

However, it is apparent that the trigger control of the multivibrator 6 may be obtained by the rear edge of the trigger signal and the reset signal by the following leading edge of the next trigger signal. Accordingly, the duration of the output signals of the multivibrator, instead of being larger than time Ton, are larger than the "off" state time Toff, and time $t_t$ is coincident with time Toff.

Moreover, instead of relay 11 electrically connecting the trigger source 10 to the multivibrator reset input 13 with its mechanical contact 14, there could be used a remotely controlled electronic device providing the same switching function.

What is claimed is:

1. Apparatus for measuring the amount of fuel in a fuel tank, comprising:
  (A) a capacitive probe disposed in a fuel tank in such a manner that the capacitance of said probe varies as a function of the level of fuel in said tank, the level of fuel in said tank being not linearly proportional to the volume of fuel in said tank whereby said capacitance varies in a manner which is not linearly proportional to the volume of fuel in the tank;
  (B) an electronic circuit for generating an output signal indicative of the capacitance of said probe; said electronic circuit comprising;
    (1) a trigger source for generating trigger pulses having a predetermined frequency, said trigger pulses having a constant duty cycle; and
    (2) a monostable multivibrator coupled to said probe and said trigger source, said multivibrator being triggered by said trigger pulses and responding to each said trigger pulse by generating an output pulse having a duration determined by the capacitance of said probe, said output pulses defining said output signal; said multivibrator having a reset input, said multivibrator responding to the application of a pulse to its reset input by generating an output pulse having a duty cycle equal to the duty cycle of the pulse applied to its reset input;
  (C) transform means including a read only memory storing information relating to the amount of fuel in said tank as determined by the shape of said tank, said transform means for converting said duration of said output pulses of said output signal which is indicative of the level of fuel in said tank to a fuel volume signal having a duration which is indicative of the volume of fuel in said tank;
  (D) display means responsive to said fuel volume signal for displaying the amount of fuel in said tank; and
  (E) means for applying said trigger pulses to said reset input of said multivibrator for testing said apparatus whereby said display means applies said trigger pulses to said reset input.

2. Apparatus according to claim 1, wherein the shape of said tank is irregular and the capacitance profile of said probe is not matched to said shape of said tank.

3. Apparatus according to claim 2, wherein the capacitance profile of said probe is regular.

4. Apparatus according to claim 1, wherein the duty factor of said output signal is proportional to the capacitance of said probe and wherein said transform means converts said output signal into a fuel signal whose duty cycle is proportional to the amount of fuel in said tank.

5. Apparatus according to claim 2, wherein said applying means includes a human actuable switch and applies said trigger pulses to said reset input in response to the actuation of said switch.

6. Apparatus according to claim 1, wherein said multivibrator is calibrated to produce, when said tank is empty, output pulses whose duty cycle is equal to the duty cycle of said trigger pulses.

7. Apparatus for measuring the amount of fuel in a fuel tank; comprising:
(A) a capacitive probe disposed in a fuel tank in such a manner that the capacitance of said probe varies as a function of the level of fuel in said tank, the level of fuel in said tank being not linearly proportional to the volume of fuel in said tank;
(B) an electronic circuit for generating an output signal indicative of the capacitance of said probe;
(C) transform means for converting said output signal to a fuel volume signal indicative of the volume of fuel in said tank, said transform means comprising:
 (1) a source of clock pulses;
 (2) input counter means receiving said clock pulses and said output signals, said input counter means counting said clock pulses during intervals determined by the duty cycle of said output signals to provide input count values representing the duty cycle of said output signal;
 (3) conversion means including a look-up table means having stored values representing respective amounts of fuel in said tank, each paired with a corresponding level of fuel in said tank for converting said input count values to corresponding output count values that are proportional to the amount of fuel in said tank; and
 (4) output counter means receiving said clock pulses and said output count values for generating a fuel level signal having a duty cycle that is proportional to the amount of fuel in said tank; and
(D) display means responsive to said fuel volume signal for displaying the amount of fuel in said tank.

8. Apparatus according to claim 7, in which the tank is of non-uniform cross-section, said probe has a capacitance profile that is an essentially linear function of the level of fuel in said tank, and said look-up table stores numerical values in pairs which relate the fuel level in the tank to the amount of fuel in the tank.

9. Apparatus for measuring the amount of fuel in a fuel tank, comprising:
a capacitive probe disposed in a fuel tank in such a manner that the capacitance of said probe varies as a function of the level of fuel in said tank, the level of fuel in said tank being not linearly proportional to the volume of fuel in said tank;
an electronic circuit for generating an output signal indicative of the capacitance of said probe;
transform means responsive to said output signal for providing a fuel volume signal which is indicative of the volume of fuel in said tank, said transform means converting said output signal into said fuel volume signal using a look-up table means, said transform means including counter means for digitizing said output signal to input numerical values corresponding to the duty cycle of said output signal and a look-up table means having stored values representing respective amounts of fuel in said tank, each paired with a corresponding level of fuel in said tank, said look-up table means being connected to said counter means for converting said input numerical values to corresponding output numerical values that are a linear function of the amount of fuel in said tank; and
display means responsive to said fuel volume signal for displaying the amount of fuel in said tank.

10. Apparatus for measuring the amount of fuel in a tank, comprising:
a capacitive probe disposed in a fuel tank in such a manner that the capacitance of said probe varies as a function of the level of fuel in said tank being not linearly proportional to the volume of fuel in said tank;
an electronic circuit for generating an output signal indicative of the capacitance of said probe;
transform means for converting said output signal to a fuel volume signal indicative of the volume of fuel in said tank, the duty factor of said output signal being proportional to the capacitance of said probe, said transform means including a look-up table means having stored values representing respective amounts of fuel in said tank, each paired with a corresponding level of fuel in said tank, said transform means converting said output signal into a fuel volume signal whose duty cycle is proportional to the amount of fuel in said tank, the frequency of said output signal and the frequency of said fuel level signal being constant; and
display means responsive to said fuel volume signal for displaying the amount of fuel in said tank as a function of said duty cycle of said fuel volume signal.

* * * * *